United States Patent
Glickman

(10) Patent No.: US 7,797,369 B2
(45) Date of Patent: Sep. 14, 2010

(54) SYSTEM AND METHOD FOR CONTROLLING A TRANSMISSION OF IMAGE DATA TO A DISPLAY DEVICE

(75) Inventor: Jeff Glickman, Las Vegas, NV (US)

(73) Assignee: Seiko Epson Corporation, Shinjuku-ku, Tokyo (JP)

( * ) Notice: Subject to any disclaimer, the term of this patent is extended or adjusted under 35 U.S.C. 154(b) by 1532 days.

(21) Appl. No.: 11/012,978

(22) Filed: Dec. 14, 2004

(65) Prior Publication Data

US 2005/0154778 A1     Jul. 14, 2005

Related U.S. Application Data

(60) Provisional application No. 60/530,465, filed on Dec. 16, 2003.

(51) Int. Cl.
*G06F 19/00* (2006.01)
(52) U.S. Cl. .......................................... 709/201; 700/1
(58) Field of Classification Search ............... 700/15, 700/17, 90; 382/164, 173, 218, 232, 233, 382/236, 240; 359/142, 143
See application file for complete search history.

(56) References Cited

U.S. PATENT DOCUMENTS

| | | | |
|---|---|---|---|
| 4,925,960 A * | 5/1990 | Lechtken et al. ............ 549/412 |
| 5,822,524 A | 10/1998 | Chen et al. |
| 5,969,763 A | 10/1999 | Sakamoto |
| 6,282,330 B1 | 8/2001 | Yokota et al. |
| 6,360,003 B1 | 3/2002 | Doi et al. |
| 6,529,757 B1 | 3/2003 | Patel et al. |
| 6,636,260 B2 * | 10/2003 | Kiyokawa ................. 348/222.1 |
| 6,860,609 B2 | 3/2005 | Olson et al. |

(Continued)

FOREIGN PATENT DOCUMENTS

GB     2091970     8/1982

(Continued)

OTHER PUBLICATIONS

Pettelkau, Jeff. Toshiba TDP-SW20 Wireless DLP Projector. Oct. 2004 [retrieved on Mar. 15, 2007]. Retrieved from the Internet: <URL: http://www.jiwire.com/toshiba-TDP-SW20-wireless-projector-photo-image-gallery.htm>.

(Continued)

*Primary Examiner*—Kidest Bahta
(74) *Attorney, Agent, or Firm*—Townsend and Townsend and Crew, LLP

(57) ABSTRACT

A method of controlling a transmission of image data from an image source to an image display device is disclosed, wherein the method includes transmitting the image data from the image source to the image display device, receiving the image data in a buffer on the image display device, reading at least some of the image data out of the buffer for processing by the image display device, monitoring an amount of unprocessed image data in the buffer, transmitting a value representing an amount of unprocessed image data in the buffer from the image display device to the image source, and adjusting the transmission of the image data to the image display device by the image source if the value representing the amount of unprocessed image data meets a preselected condition.

49 Claims, 2 Drawing Sheets

U.S. PATENT DOCUMENTS

| | | | |
|---|---|---|---|
| 2001/0033404 A1 | 10/2001 | Escobosa et al. | |
| 2002/0003903 A1* | 1/2002 | Engeldrum et al. | 382/233 |
| 2002/0012433 A1 | 1/2002 | Haverinen et al. | |
| 2003/0017846 A1 | 1/2003 | Estevez et al. | |
| 2003/0112334 A1* | 6/2003 | Kiyokawa | 348/207.1 |
| 2005/0147281 A1* | 7/2005 | Wang et al. | 382/119 |

FOREIGN PATENT DOCUMENTS

| | | |
|---|---|---|
| GB | 2274041 | 7/1994 |
| JP | 09-130749 A | 5/1997 |
| JP | 2003020694 * | 2/2003 |
| WO | WO 02/45372 A | 6/2002 |

OTHER PUBLICATIONS

Babel et al., *Lossless and lossy minimal redundancy pyramidal decomposition for scalable image compression technique*, UMR CNRS 6164 IETR Groupe Image ICASSP 2003, pp. 249-252.

You et al, *Pyramidal image compression using anisotropic and error-corrected interpolation*, Department of Electrical Engineering, University of Minnesota.

* cited by examiner

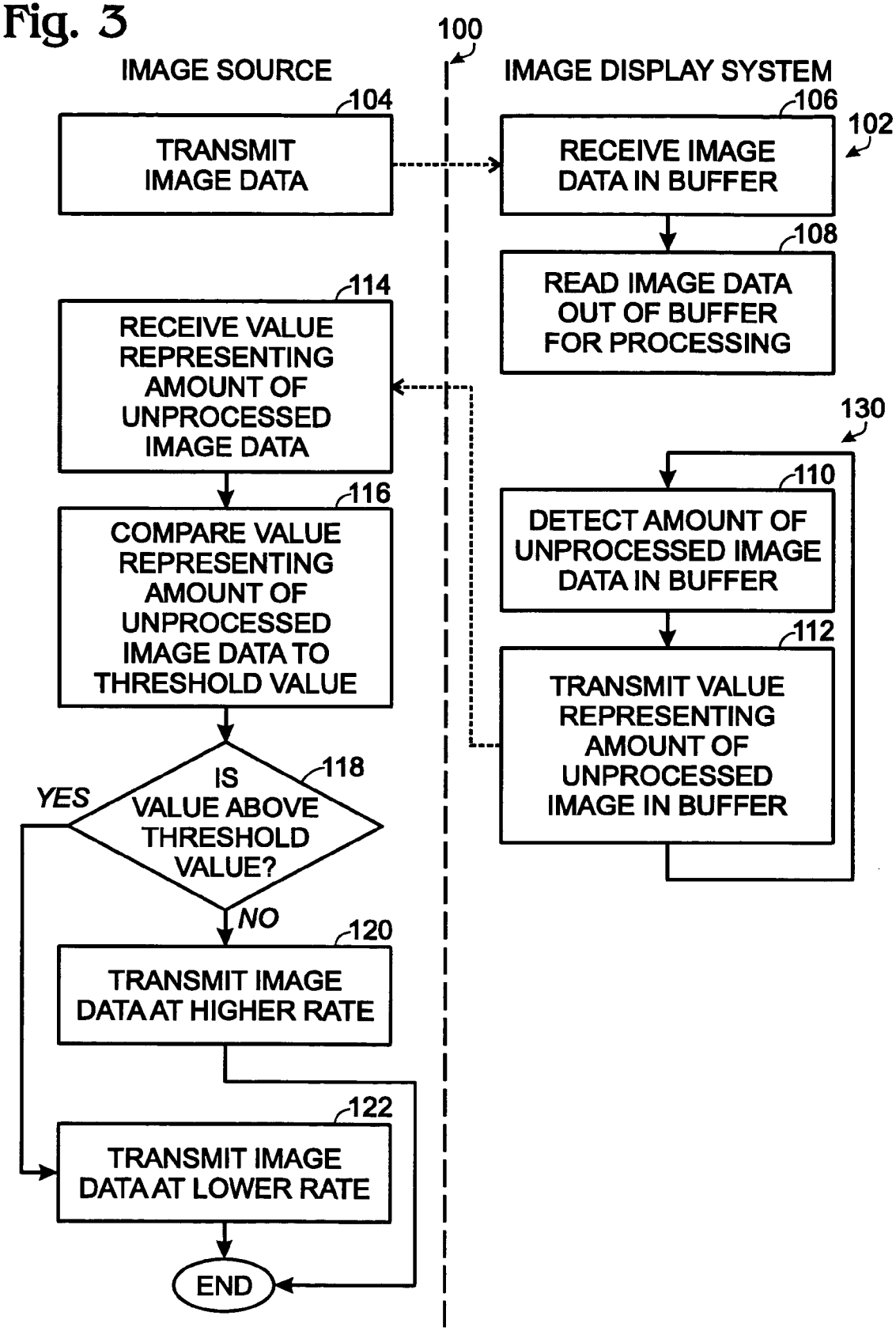

ly from image sources, for example, via a communications protocol such as 802.11b (or other 802.11 protocols), Bluetooth, etc. These display devices may allow image sources to be quickly connected from almost any location within a meeting room, and thus may facilitate the use of multiple image sources with a single display device.

SYSTEM AND METHOD FOR CONTROLLING A TRANSMISSION OF IMAGE DATA TO A DISPLAY DEVICE

CROSS-REFERENCE TO RELATED APPLICATION

The present application claims priority from U.S. Provisional Patent Application Ser. No. 60/530,465 filed Dec. 16, 2003, hereby incorporated by reference in its entirety for all purposes.

TECHNICAL FIELD

The present disclosure relates generally to apparatus, systems and methods for controlling a transmission of data, and more specifically, to apparatus, systems and methods for controlling a transmission of image data to a display device.

BRIEF DESCRIPTION OF THE DRAWINGS

The disclosure is illustrated by way of example and not by way of limitation in the figures of the accompanying drawings, in which the like references indicate similar elements and in which:

FIG. 3 is a flow diagram of a method of controlling a transmission of image data from an image source to an image display device according to another embodiment of the present invention.

DETAILED DESCRIPTION

Figure 1:
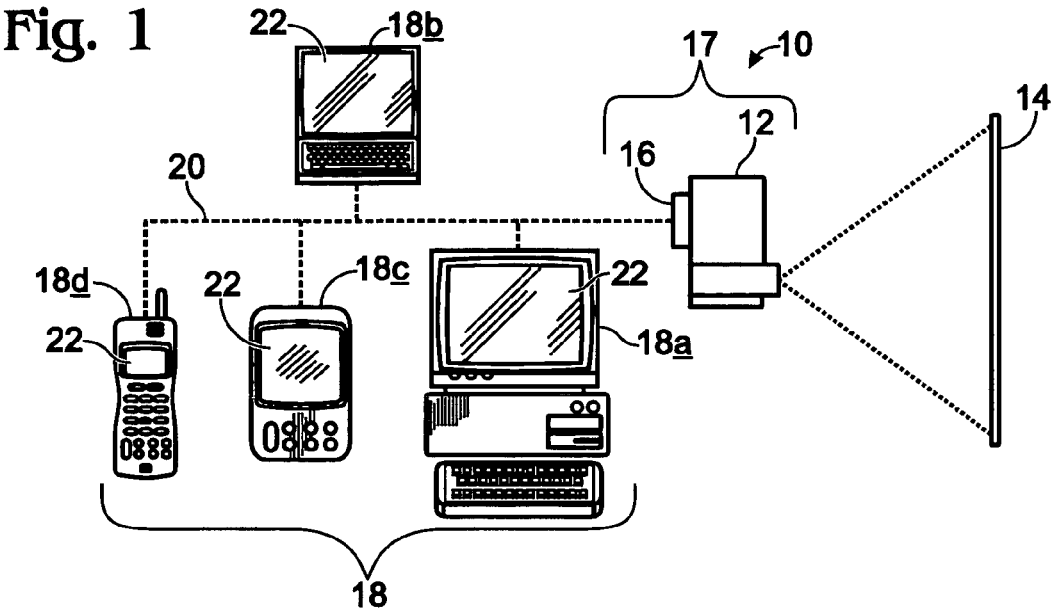
FIG. 1 is a schematic view of an image processing and display system according to an embodiment of the present invention.

FIG. 1 shows, generally at 10, a schematic depiction of an image processing system according to a first embodiment of the present invention. Image processing system 10 includes a display device 12 configured to display an image on a viewing surface 14. Display device 12 may be any suitable type of display device. Examples include, but are not limited to, liquid crystal display (LCD) and digital light processing (DLP) projectors, television systems, computer monitors, etc.

Image processing system 10 also includes an image-rendering device 16 associated with display device 12, and one or more image sources 18 in electrical communication with image-rendering device 16. Image-rendering device 16 is configured to receive image data transmitted by image sources 18, and to process the received image data for display by display device 12. Image-rendering device 16 may be integrated into display device 12, or may be provided as a separate component that is connectable to the display device. An example of a suitable image-rendering device is disclosed in U.S. patent application Ser. No. 10/453,905, filed on Jun. 2, 2003, which is hereby incorporated by reference.

Display device 12 and image-rendering device 16 may each be referred to herein as an "image display device," and also may be referred to herein collectively as "display system 17." Thus, it will be appreciated that the systems and methods disclosed herein as being implemented on display system 17 may be implemented on either of, or both of, display device 12 and image-rendering device 16.

Image data may be supplied to a display device via an image source such as a laptop or desktop computer, a personal digital assistant (PDA), or other computing device. Such display devices may be configured to receive image data wirelessly from image sources, for example, via a communications protocol such as 802.11b (or other 802.11 protocols), Bluetooth, etc. These display devices may allow image sources to be quickly connected from almost any location within a meeting room, and thus may facilitate the use of multiple image sources with a single display device.

However, supporting the use of multiple image sources with a single display device may pose various difficulties. For example, different image sources may have different image data processing and transmission capabilities, and may transmit data to the display device at different rates. Some image sources may transmit data to the display device at a higher rate than the rate at which the display device is able to process the data for display. This may cause a data input buffer on the display device to be overwhelmed with data, and may lead to errors in data transmission and image display.

Image sources 18 may include any suitable device that is capable of providing image data to display system 17. Examples include, but are not limited to, desktop computers and/or servers 18a, laptop computers 18b, personal digital assistants (PDAs) 18c, mobile telephones 18d, etc. Additionally, image sources 18 may communicate electrically with display system 17 in any suitable manner. In the depicted embodiment, each image source 18 communicates electrically with display system 17 over a wireless network 20. However, image sources 18 may also communicate with display system 17 over a wired network, over a wireless or wired direct connection, etc. or any combination thereof.

Figure 2:
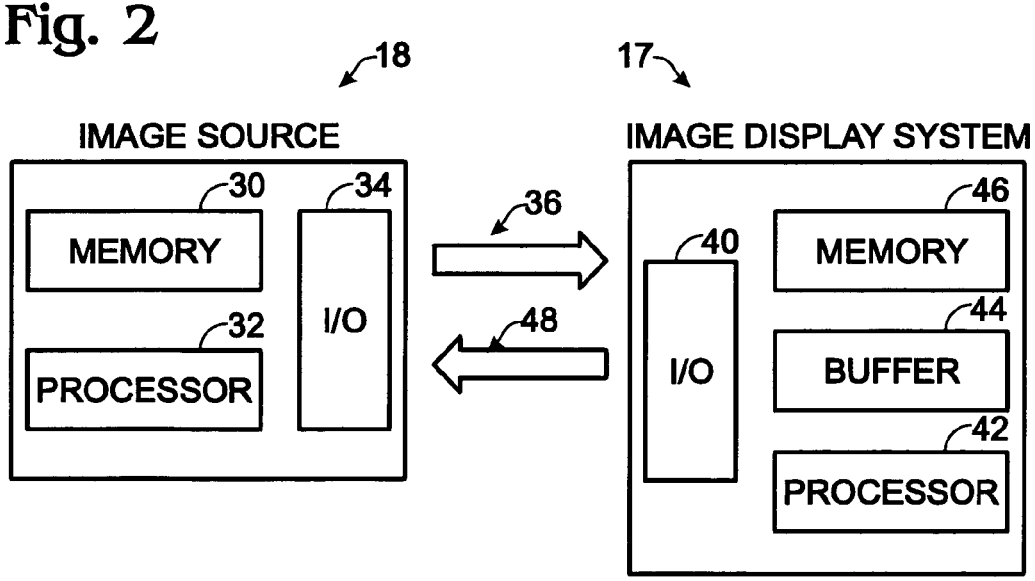
FIG. 2 is a block diagram of an image source and image display device according to another embodiment of the present invention.

FIG. 2 shows a block diagram of display system 17 and one of image sources 18. Image source 18 includes memory 30, a processor 32 and input/output ports 34. Memory 30 may include code stored thereon that is executable by processor 32 to send image data to display system 17 via input/output ports 34 and a forward communications channel 36. Image source 18 may be configured to send image data to display system 17 in any suitable manner and format. For example, image source 18 may include software stored in memory 30 that is executable to generate a bitmap of an image displayed on the image source display (e.g., screen of monitor for desktop computer 18a, screen of laptop 18b, etc.), and then compress and transmit the bitmap to display system 17 for display. Furthermore, image source 18 may include software configured to identify portions of an image that have been changed, and then to encode, compress and transmit only the changed portions of the image. It will be appreciated that these methods of sending image data are merely exemplary, and that image source 18 may be configured to send data to display system 17 in any other suitable manner and/or format other than those described above.

Next, display system 17 also includes input/output ports 40 for communicating with image source 18, and an input buffer 44 for temporarily storing compressed image data received from image source 18 that are pending decompression and processing. Display system 17 also includes a processor 42 and memory 46 for storing code executable by processor 42 to process the data received in buffer 44 and to perform other operations described herein.

As mentioned above, depending upon the relative processing capabilities of image source 18 and display system 17, situations may arise when an image source transfers image data to display system 17 at a higher rate than the rate at which unprocessed image data in buffer 44 is read out of the buffer for processing. To prevent display system 17 from being overwhelmed with image data, display system 17 may include software (or firmware or hardware) configured to monitor an amount of unprocessed image data in buffer 44, and to transmit a value representing an amount of unprocessed image data in the buffer from display system 17 to the image source over a backward communication channel 48. Image source 18 may be configured to adjust the transmission of the image data to the image display device if the value representing the amount of unprocessed image data meets a preselected condition relative to a preselected threshold.

FIG. 3 shows, generally at 100, a first exemplary embodiment of a method of controlling the transmission of image data between image sources 18 and display system 17. FIG. 3 also illustrates, generally at 102, the transmission of image data from image source 18 to display system 17 and the processing of the image data by the display system. The various operations depicted in FIG. 3 as being performed on image display system 17 may be performed by execution of code stored in memory 46 by processor 42, while those depicted as being performed on image source 18 may be performed by execution of code stored in memory 30 by processor 32. The code may also be stored on a computer-readable storage medium such as a magnetic disk, CD-ROM, hard disk drive, and be transferable to image source 18 and/or display system 17.

The transmission and processing of image data at 102 includes transmitting the image data from the image source to the display system at 104, receiving the image data in the buffer on the display system at 106, and then reading the image data out of the buffer for processing by the display system at 108. Transmitting the image data at 104 may include any of several possible sub-steps. These possible sub-steps may include, but are not limited to, any or all of the following: generating a bitmap of an image displayed on the image source, filtering low-variance data from the bitmap to improve the compression of non-computer graphics data with a computer graphics data compressor, subsampling the image data, and compressing the image data via one or more compression steps. These substeps may be performed on an entire image, or only on portions of an image that have changed pixels relative to an immediately prior image.

Where transmitting the image data at 104 includes one or more compression steps, any suitable compression methods may be used. For example, in applications such as the compression and transmission of video data where it is desired to compress the image data in real-time, suitable compression methods include, but are not limited to, LZO compression techniques, as well as hierarchical compression techniques such as pyramidal compression.

During the transmission, reception and processing of image data at 102, display system 17 may detect or monitor, at 110, an amount of unprocessed image data in the buffer. Display system 17 may also send, at 112, a value representing the amount of unprocessed image data in the buffer to image source 18. The value representing the amount of unprocessed image data in the buffer may be any suitable quantity with a dependent relationship to the amount of unprocessed image data in the buffer. For example, the value representing the amount of unprocessed image data in the buffer may be an absolute amount of unprocessed image data in the buffer, or may be an absolute amount of memory in the buffer not occupied by unprocessed image data. Alternatively, the value representing the amount of unprocessed image data in the buffer may be a percentage of the buffer occupied or not occupied by the unprocessed image data.

Image source 18 receives the value representing the amount of unprocessed image data in the buffer at 114. Next, image source 18 compares, at 116 the value representing the amount of unprocessed image data in the buffer to a preselected threshold value, and if the value representing the amount of unprocessed image data in the buffer meets a preselected condition relative to the threshold value, then the image source adjusts the transmission of the image data to prevent overwhelming display system 17 with too much image data.

The preselected condition may correspond to any suitable relationship relative to the predetermined value. In the depicted embodiment, image source 18 determines, at 118, whether the value representing the amount of unprocessed image data in the buffer is above the threshold value. Alternatively, image source 18 may determine whether the value representing the amount of unprocessed image data is above or equal to the threshold value. These alternate comparisons may be used where the value that represents the amount of unprocessed image data in the buffer is either an absolute amount of unprocessed image data in the buffer, or a percentage of the buffer occupied by unprocessed image data. Alternatively, where the value that represents the amount of unprocessed image data in the buffer is an absolute amount, or a percentage of, the buffer not occupied by image data, then the image source 18 may determine whether this value is below (or, alternatively, below or equal to) the threshold value.

If image source 18 determines at 118 that the value representing the amount of unprocessed image data in the buffer is not above the threshold value, then the image source 18 continues to transmit image data at an ordinary, higher rate, as indicated at 120. On the other hand, if image source 18 determines at 118 that the value representing the amount of unprocessed image data in the buffer is above the threshold value, then image source 18 may begin to transmit image data to display system 17 at a lower rate, at 122, to prevent overwhelming the display system with image data. Alternatively, where the value representing the amount of unprocessed image data in the buffer is either an absolute amount of unoccupied buffer or a percentage of unoccupied buffer, the image data transmission rate may be lowered when these values fall below (or, below or equal to) the preselected threshold.

Image source 18 may lower the rate of image data transmission in any suitable manner. For example, where image source 18 generates transmits bitmaps of each image displayed on the image source (as described above), the image source may lower the rate at which the bitmaps are generated. Alternatively, where image source 18 hierarchically encodes the image data, only a portion of the hierarchical image data may be transferred for a selected image when the value representing the amount of unprocessed image data in the buffer is above the threshold value. This effectively reduces the resolution of the image data being transmitted until the rate of transmission is increased.

As indicated by arrow 130, display system 17 may be configured to detect and transmit the value representing the amount of unprocessed image data in the buffer on a periodic and repeating basis. This value may be detected and transmitted at any desired interval. For example, this value may be transmitted at a regular time interval. Examples of suitable time intervals include, but are not limited to, those in the range of between approximately 0.05 second and 0.2 second. A specific example of a suitable time interval within this range is approximately 0.1 second. It will be appreciated that the above stated time intervals are merely exemplary, and that any other suitable time interval may be used. Furthermore, intervals measured by a quantity other than time may be used. For example, the value representing the amount of unprocessed image data may be transmitted to image source 18 upon the receipt of a specific quantity of image data from image source 18.

As described above, in one embodiment a method is provided for controlling a transmission of image data from an image source to an image display device, wherein the method includes transmitting the image data from the image source to the image display device, receiving the image data in a buffer on the image display device, reading at least some of the image data out of the buffer for processing by the image display device, monitoring an amount of unprocessed image data in the buffer, transmitting a value representing an amount of unprocessed image data in the buffer from the image display device to the image source, and adjusting the transmission of the image data to the image display device by the image source if the value representing the amount of unprocessed image data meets a preselected condition.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of controlling a transmission of image data from an image source to an image display device using the image source for display on a viewing surface, the method comprising:
   transmitting the image data from the image source to the image display device using the image source;
   receiving the image data in a buffer using the image display device, the buffer being a data input buffer;
   reading at least some of the image data out of the buffer for processing using the image display device;
   monitoring an amount of unprocessed image data in the buffer using the image display device;
   transmitting a value representing an amount of unprocessed image data in the buffer from the image display device to the image source using the image display device; and
   adjusting the transmission of the image data to the image display device by the image source if the value representing the amount of unprocessed image data meets a preselected condition using the image source.

2. The method of claim 1, wherein transmitting the image data to the display device includes periodically generating bitmaps of images using the image source, compressing the bitmaps to form compressed image data using the image source, and then transmitting the compressed image data to the image display device using the image source.

3. The method of claim 2, wherein adjusting the transmission of the image data includes slowing a rate at which the bitmaps are generated.

4. The method of claim 1, wherein transmitting a value representing an amount of unprocessed image data in the buffer includes transmitting a value representing a percentage of the buffer occupied by the image data.

5. The method of claim 4, wherein adjusting the transmission of the image data to the image display device if the value representing the amount of unprocessed image data meets a preselected condition includes lowering a rate of transmission if the percentage of the buffer occupied by the image data is equal to or above a threshold percentage.

6. The method of claim 1, wherein transmitting a value representing an amount of unprocessed image data in the buffer includes transmitting a value representing an absolute amount of unprocessed image data in the buffer.

7. The method of claim 6, wherein adjusting the transmission of the image data to the image display device if the value representing the amount of unprocessed image data meets a preselected condition includes lowering a rate of transmission if the absolute amount of unprocessed image data in the buffer is equal to or above threshold amount.

8. The method of claim 7, wherein lowering a rate of transmission includes lowering a rate of image data acquisition by the image source.

9. The method of claim 7, wherein lowering a rate of image transmission includes reducing a degree of resolution of image data transmitted by the image source.

10. The method of claim 1, wherein transmitting a value representing an amount of unprocessed image data in the buffer includes transmitting a value representing a size of the buffer not occupied by the image data.

11. The method of claim 10, wherein adjusting the transmission of the image data to the image display device if the value representing the amount of unprocessed image data meets a preselected condition includes lowering a rate of transmission if the size of the buffer not occupied by the image data is equal to or below a threshold size.

12. The method of claim 1, wherein transmitting a value representing an amount of unprocessed image data in the buffer includes periodically transmitting a value representing an amount of unprocessed image data in the buffer.

13. The method of claim 12, wherein the value representing an amount of unprocessed image data in the buffer is transmitted at intervals of between approximately 0.05 and 0.2 second.

14. A method of controlling a transmission of image data from an image source to an image display device using the image source for display on a viewing surface, the method comprising:
   receiving the image data transmitted by the image source into a buffer on the image display device using the image display device, the buffer being a data input buffer;
   reading the image data out of the buffer for processing using the image display device;
   monitoring an amount of unprocessed image data in the buffer using the image display device; and
   transmitting a value representing the amount of unprocessed image data in the buffer to the image source using the image display device, wherein the image source is configured to adjust the transmission of the image data in response to the value representing the amount of unprocessed image data.

15. The method of claim 14, wherein the image data is received over a first communications channel, and wherein the value representing the amount of unprocessed image data in the buffer is sent over a second communications channel.

16. The method of claim 14, wherein transmitting the value representing the amount of unprocessed image data in the buffer includes transmitting a value representing a percentage of the buffer occupied by the image data.

17. The method of claim 14, wherein transmitting the value representing the amount of unprocessed image data in the buffer includes transmitting a value representing an absolute quantity of image data in the buffer.

18. The method of claim 14, wherein transmitting the value representing the amount of unprocessed image data in the buffer includes transmitting a value representing an amount of the buffer not occupied by unprocessed image data.

19. The method of claim 14, wherein transmitting the value representing the amount of unprocessed image data includes periodically transmitting values representing the amount of unprocessed image data in the buffer.

20. The method of claim 19, wherein the values representing the amount of unprocessed image data are transmitted at intervals of approximately 0.05-0.2 second.

21. A method of controlling a transmission of image data to an image display device using an image source for display on a viewing surface, the method comprising:
   transmitting, from an image source, the image data to the image display device using the image source;
   receiving, at the image source, a value representing an amount of unprocessed data in a buffer on the image display device from the image display device using image source; and
   adjusting the transmission of the image data from the image source to the display device in response to receiving the value representing the amount of unprocessed data in the buffer using the image source.

22. The method of claim 21, wherein receiving the value representing the amount of unprocessed image data in the buffer includes receiving a value representing a percentage of the buffer occupied by the image data.

23. The method of claim 21, wherein receiving the value representing the amount of unprocessed image data in the buffer includes receiving a value representing an absolute quantity of image data in the buffer.

24. The method of claim 21, wherein receiving the value representing the amount of unprocessed image data in the buffer includes receiving a value representing an amount of memory in the buffer not occupied by unprocessed image data.

25. The method of claim 21, wherein receiving the value representing the amount of unprocessed image data includes periodically receiving values representing the amount of unprocessed image data in the buffer.

26. The method of claim 25, wherein the values representing the amount of unprocessed image data are received at intervals of approximately 0.05-0.2 second.

27. The method of claim 21, wherein adjusting the transmission of the image data to the display device includes lowering a rate of transmission of image data to the display device.

28. The method of claim 21, wherein transmitting the image data to the display device includes periodically generating bitmaps of images on the image source, compressing the bitmaps to form compressed image data, and then transmitting the compressed image data to the image display device.

29. The method of claim 28, wherein adjusting the transmission of the image data to the display device includes slowing a rate at which the bitmaps are generated.

30. The method of claim 28, wherein adjusting the transmission of the image data to the display device includes reducing a resolution at which the bitmaps are acquired.

31. An image display device including memory, a processor, and code stored in the memory and executable by the processor to control a transmission of image data from an image source to the image display device for display on a viewing surface, the code comprising:
   code for receiving the image data transmitted by the image source in a buffer on the image display device, the buffer being a data input buffer;
   code for reading the image data out of the buffer for processing;
   code for monitoring an amount of unprocessed image data in the buffer; and
   code for transmitting a value representing the amount of unprocessed image data to the image source.

32. The image display device of claim 31, wherein the code for transmitting the value representing the amount of unprocessed image data in the buffer includes code for transmitting a value representing a percentage of the buffer occupied by the image data.

33. The image display device of claim 31, wherein the code for transmitting the value representing the amount of unprocessed image data in the buffer includes code for transmitting a value representing an absolute quantity of image data in the buffer.

34. The image display device of claim 31, wherein the code for transmitting the value representing the amount of unprocessed image data in the buffer includes code for transmitting a value representing an amount of memory in the buffer not occupied by unprocessed image data.

35. The image display device of claim 31, wherein the code for transmitting the value representing the amount of unprocessed image data includes code for periodically transmitting values representing the amount of unprocessed image data in the buffer.

36. The image display device of claim 35, wherein the code for periodically transmitting values representing the amount of unprocessed image data in the buffer includes code for transmitting the values representing the amount of unprocessed image data at intervals of approximately 0.05 second to 0.2 second.

37. An image source having memory, a processor, and code stored in the memory and executable by the processor to control a transmission of image data from the image source to an image display device for display on a viewing surface, the code comprising:
   code for transmitting the image data from the image source to the image display device;
   code for receiving a value representing an amount of unprocessed data in a buffer on the image display device from the image display device; and
   code for adjusting the transmission of the image data from the image source to the image display device in response to receiving the value representing the amount of unprocessed data in the buffer.

38. The image source of claim 37, wherein the code for receiving the value representing the amount of unprocessed image data in the buffer includes code for receiving a value representing a percentage of the buffer occupied by the image data.

39. The image source of claim 37, wherein the code for receiving the value representing the amount of unprocessed image data in the buffer includes code for receiving a value representing an absolute quantity of image data in the buffer.

40. The image source of claim 37, wherein the code receiving the value representing the amount of unprocessed image data in the buffer includes code for receiving a value representing an amount of memory in the buffer not occupied by unprocessed image data.

41. The image source of claim 37, wherein the code for receiving the value representing the amount of unprocessed image data includes code for periodically receiving values representing the amount of unprocessed image data in the buffer.

42. The image source of claim 41, wherein the code for periodically receiving values representing the amount of unprocessed image data in the buffer includes code for receiving the values representing the amount of unprocessed image data at intervals of approximately 0.05-0.2 second.

43. The image source of claim 37, wherein the code for adjusting the transmission of the image data to the display device includes code for lowering a rate of transmission of image data to the display device.

44. The image source of claim 37, wherein the code for transmitting the image data to the display device includes code for periodically generating bitmaps of images on the image source, code for compressing the bitmaps to form compressed image data, and code for transmitting the compressed image data to the image display device.

45. The image source of claim 44, wherein the code for adjusting a parameter related to the transmission of the image data to the display device includes code following a rate at which the bitmaps are generated.

46. The image source of claim 44, wherein the code for adjusting a parameter related to the transmission of the image data to the display device includes code for reducing a resolution at which the bitmaps are transmitted.

47. A storage medium having code stored thereon, the code being executable by an image display device having memory and a processor to control a transmission of image data from an image source to the image display device for display on a viewing surface, the code comprising:

code for receiving the image data transmitted by the image source in a buffer on the image display device, the buffer being a data input buffer;

code for reading the image data out of the buffer for processing;

code for monitoring an amount of unprocessed image data in the buffer; and code for transmitting a value representing the amount of unprocessed image data to the image source.

48. A storage medium having code stored thereon, the code being executable by an image source having a processor and memory to control a transmission of image data from the image source to an image display device for display on a viewing surface, the code comprising:

code for transmitting the image data to the image display device;

code for receiving a value representing an amount of unprocessed data in a buffer on the image display device from the image display device; and code for adjusting the transmission of the image data to the display device in response to receiving the value representing the amount of unprocessed data in the buffer.

49. The method of claim 1, where the image display device is a projector.

* * * * *